(12) United States Patent
Johnson

(10) Patent No.: US 9,027,582 B2
(45) Date of Patent: May 12, 2015

(54) FLUSH ADAPTOR FOR USE WITH A VALVE FITMENT ASSEMBLY FOR CLEANING OF THE ASSEMBLY

(75) Inventor: James Johnson, Delaware, OH (US)

(73) Assignee: Liqui-Box Corporation, Worthington, OH (US)

( * ) Notice: Subject to any disclaimer, the term of this patent is extended or adjusted under 35 U.S.C. 154(b) by 639 days.

(21) Appl. No.: 13/433,435

(22) Filed: Mar. 29, 2012

(65) Prior Publication Data

US 2012/0247513 A1 Oct. 4, 2012

Related U.S. Application Data

(60) Provisional application No. 61/469,348, filed on Mar. 30, 2011.

(51) Int. Cl.
| | |
|---|---|
| *B08B 9/032* | (2006.01) |
| *F16L 29/02* | (2006.01) |
| *B67D 7/02* | (2010.01) |

(52) U.S. Cl.
CPC ............... *F16L 29/02* (2013.01); *B67D 7/0294* (2013.01)

(58) Field of Classification Search
USPC .................. 137/15.04, 15.05, 240; 251/149.4
See application file for complete search history.

(56) References Cited

U.S. PATENT DOCUMENTS

| | | | | |
|---|---|---|---|---|
| 4,862,918 | A | * | 9/1989 | Schroeder ................. 251/149.4 |
| 6,170,543 | B1 | | 1/2001 | Simmel et al. |
| 7,044,441 | B2 | * | 5/2006 | Doyle ........................ 251/149.4 |
| 8,511,639 | B2 | * | 8/2013 | Johnson .................... 251/149.6 |
| 2008/0053568 | A1 | | 3/2008 | Johnson |

FOREIGN PATENT DOCUMENTS

| | | |
|---|---|---|
| JP | 2005/291363 | 10/2005 |
| MX | PA 02009050 | 3/2004 |
| WO | WO 90/13510 | 11/1990 |

* cited by examiner

*Primary Examiner* — Kevin Lee
(74) *Attorney, Agent, or Firm* — Baker & Hostetler LLP

(57) ABSTRACT

A flush adaptor for use with a valve fitment assembly for dispensing liquids from a container; wherein the flush adaptor comprises an outer ring-collar; a flange with an edge molded to the bottom of the outer ring-collar; an interior ring-collar adjacent to the outer ring-collar; a ridge molded in the interior ring-collar; a seat molded onto the interior ring-collar and a pin molded into the interior ring-collar which keeps the valve in an open position; and a hollow tube molded into the adaptor to allow the flow of liquid through the adaptor and into the fitment assembly; whereby the flush adaptor allows for cleaning of the assembly and any tubes connected thereto.

4 Claims, 6 Drawing Sheets

US 9,027,582 B2

FLUSH ADAPTOR FOR USE WITH A VALVE FITMENT ASSEMBLY FOR CLEANING OF THE ASSEMBLY

CROSS-REFERENCE TO RELATED APPLICATION

This application is a Non-Provisional Patent Application claiming priority to U.S. Provisional Patent Application Ser. No. 61/469,348, filed on Mar. 30, 2011. The entire content of this application is incorporated by reference herein.

Field of the Invention

The present invention relates to an adaptor that is used in conjunction with a valve fitment assembly for dispense liquids from the container. The adaptor is utilized with the valve fitment assembly to allow for cleaning of the fitment assembly and lines connected thereto.

BACKGROUND OF THE INVENTION

It is possible that valve fitment assemblies comprising a slider valve fitment and collar that is used to dispense liquid from a collapsible bag or container, any lines connected thereto for dispensing liquids may be relatively difficult to clean. It would be desirable to have an attachment or an adaptor that can be easily attached that would allow for cleaning of the fitment assembly and any lines connected thereto.

The adaptor of this invention is readily attached to such a slider valve fitment and collar and allows for cleaning of the fitment and attached dispensing lines.

SUMMARY OF THE INVENTION

A flush adaptor used with a valve fitment assembly for dispensing liquids from a container; wherein said flush adaptor comprises the following parts:

an outer ring-collar having a top and a bottom and an outer and an inner surface, and having threads molded into said outer surface of the collar;

a flange with an edge molded to the bottom of said outer ring-collar of said adaptor;

an interior ring-collar having a top and a bottom and an outer and an inner surface molded in adjacent relationship to said outer ring-collar near the top of said interior ring-collar, and wherein said outer surface of the top part of said inner ring-collar and the top part of said inner surface of said outer ring-collar forms a U-shaped channel for receiving a part of the fitment valve assembly;

an inverted dome structure molded toward the bottom of said inner surface of said interior ring-collar defining at least one opening for the flow of fluid therethrough;

a ridge molded in said inner surface of said interior ring-collar centrally positioned in said interior ring-collar;

a seat molded onto the bottom of said interior ring-collar for forming a seal with said fitment assembly; and a pin molded into the bottom of said interior ring-collar which engages said fitment assembly and keeps a valve in said fitment assembly in an open position thereby allowing flow of fluid through said fitment assembly; and a hollow tube molded into the bottom of said adaptor and to said pin to allow the flow of liquid through said adaptor and into said fitment assembly;

whereby said flush adaptor connected to said valve fitment assembly allows for cleaning of said fitment assembly and any tubes connected thereto by passing a liquid, preferably water, through the hollow tube of said flush adaptor and into said fitment assembly and lines connected thereto thereby cleaning the assembly and lines.

In another embodiment, the present invention comprises a process for the cleaning of said valve fitment assembly and the related lines used for dispensing liquids by removing said valve fitment assembly from the liquid dispensing container and attaching the flush adaptor to said valve fitment assembly and passing liquid through said flush adaptor and fitment assembly and lines attached to said fitment, thereby cleaning the fitment and lines.

DETAILED DESCRIPTION OF THE INVENTION

As used herein, the singular form of a word includes the plural, and vice versa, unless the context clearly dictates otherwise. Thus, the references "a," "an," and "the" are generally inclusive of the plurals of the respective terms. For example, reference to "a method" includes a plurality of such "methods." Likewise, the terms "include," "including," and "or" should be all construed to be inclusive, unless such a construction is clearly prohibited from the context. Similarly, the term "examples," particularly when followed by a listing of terms, is merely exemplary and illustrative and should not be deemed to be exclusive or comprehensive.

The term "comprising" is intended to include embodiments encompassed by the terms "consisting essentially of" and "consisting of." Similarly, the term "consisting essentially of" is intended to include embodiments encompassed by the term "consisting of."

The methods and compositions and other advances disclosed herein are not limited to particular equipment or processes described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

Figure 1:
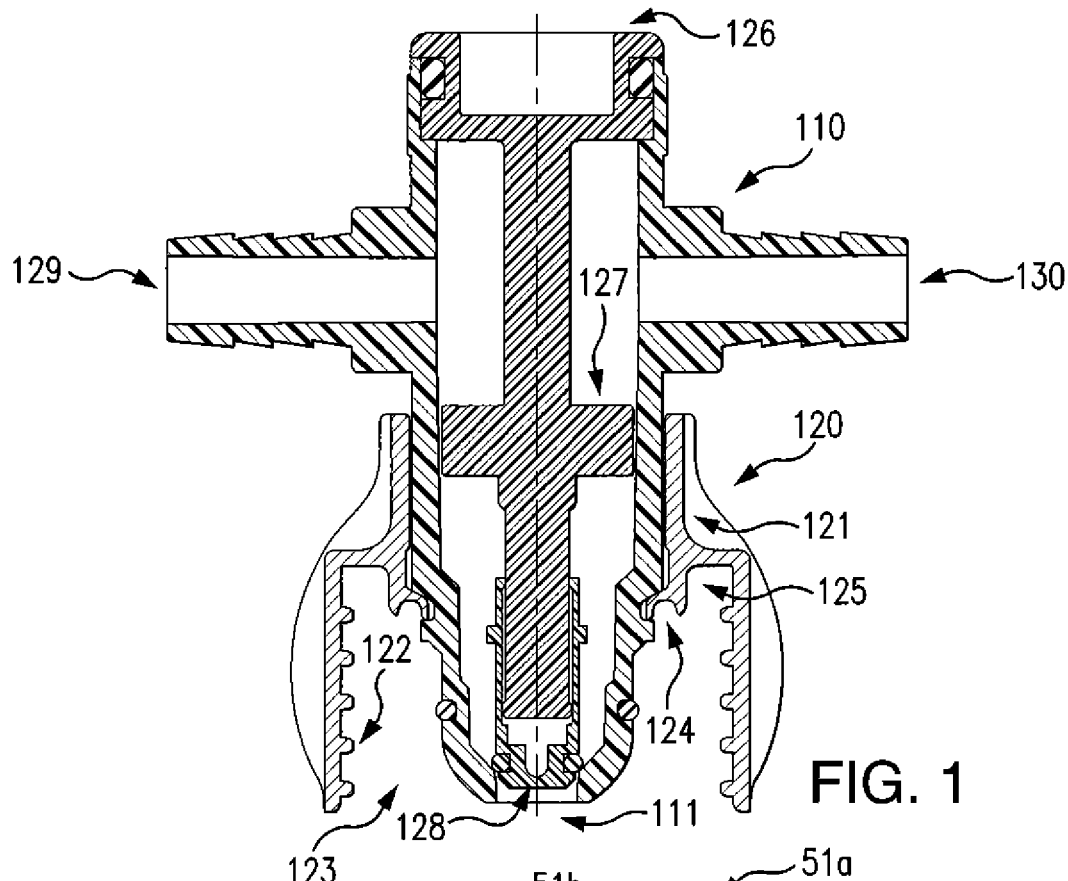
FIG. 1 is a cross-section of a valve fitment assembly of a dispensing connector and a collar.
Figure 1A:
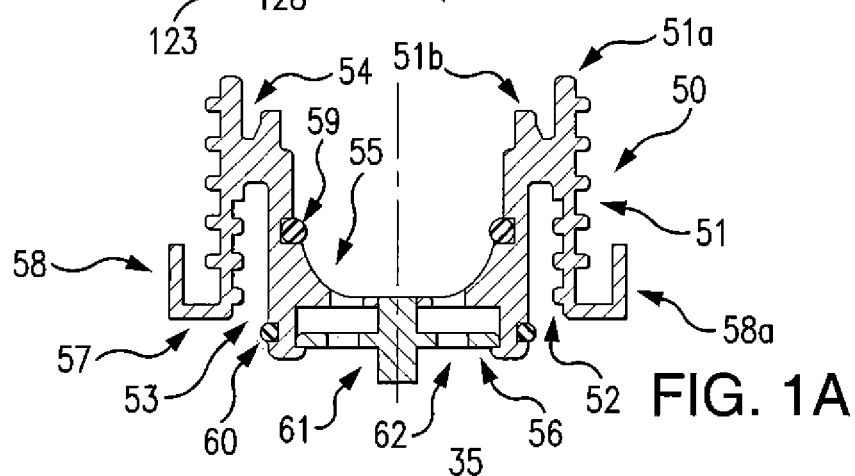
FIG. 1A is a cross-section of an adaptor used in conjunction with the valve fitment assembly for dispensing liquids.
Figure 1B:
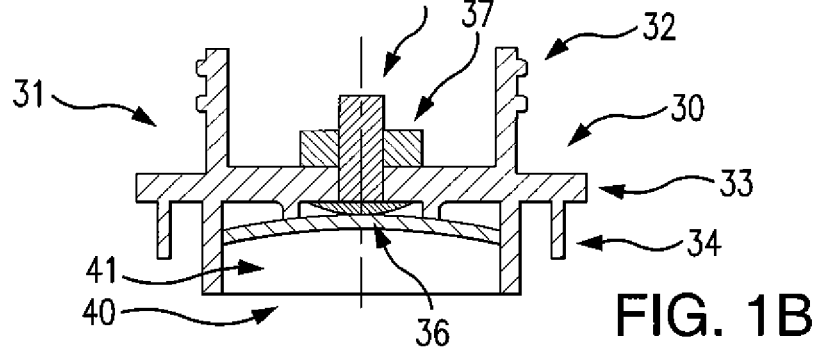
FIG. 1B is a cross-section of the cylindrical spout and valve assembly in connection with a fluid container.
Figure 2:
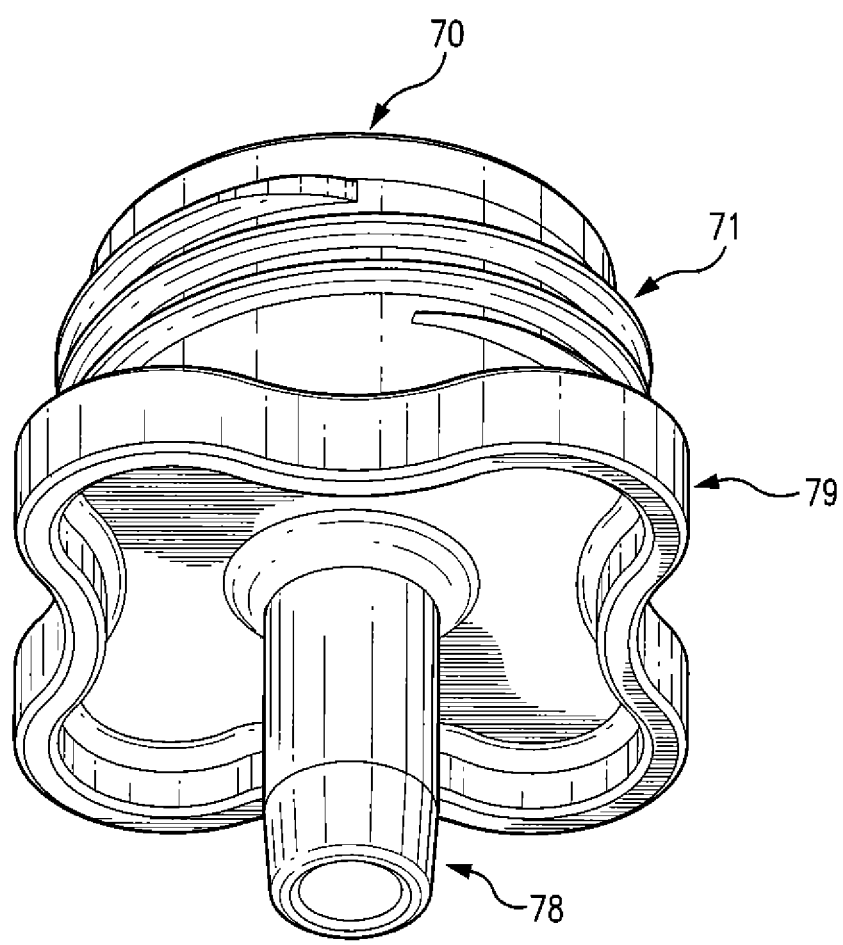
FIG. 2 is a bottom perspective view of the flush adaptor of the invention.
Figure 3:
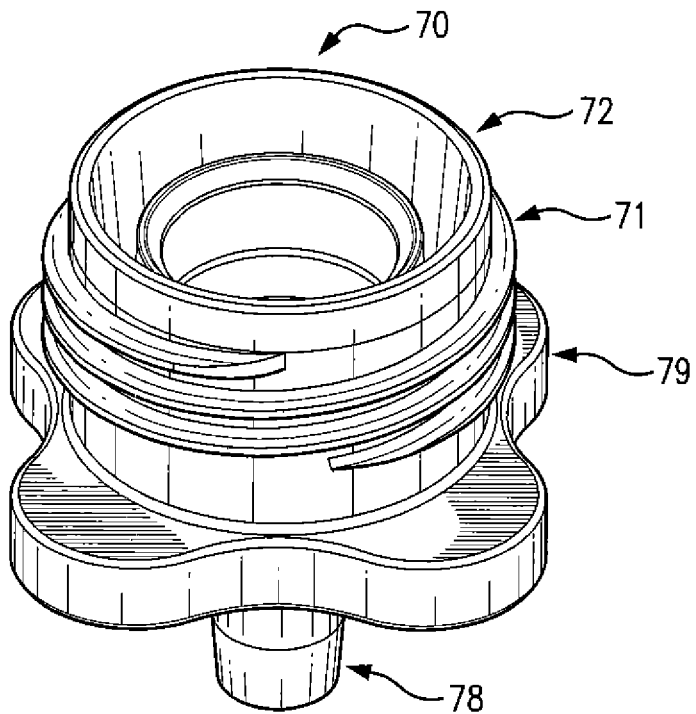
FIG. 3 is a top perspective view of the flush adaptor.
Figure 4:
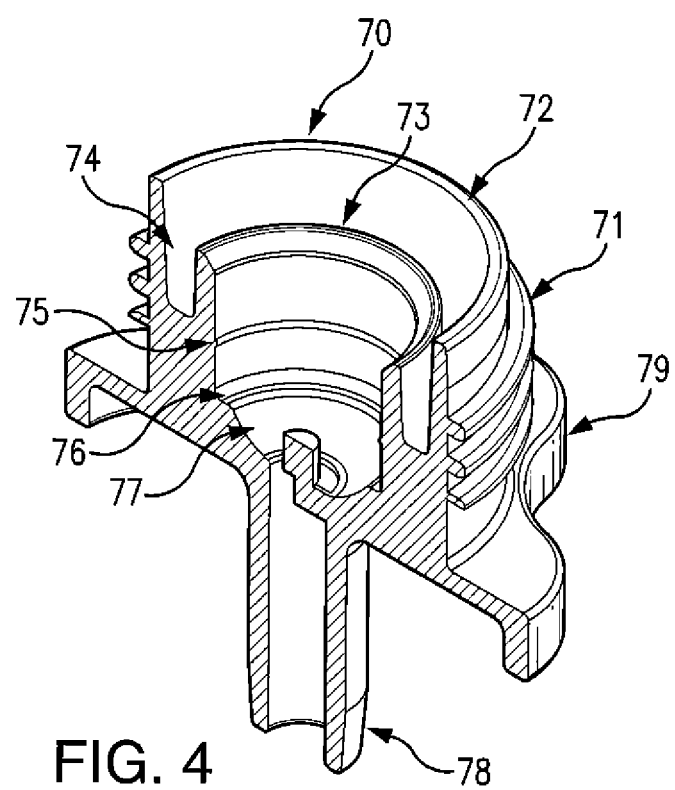
FIG. 4 is a vertical cross-section shown in a perspective view of the flush adaptor.
Figure 5:
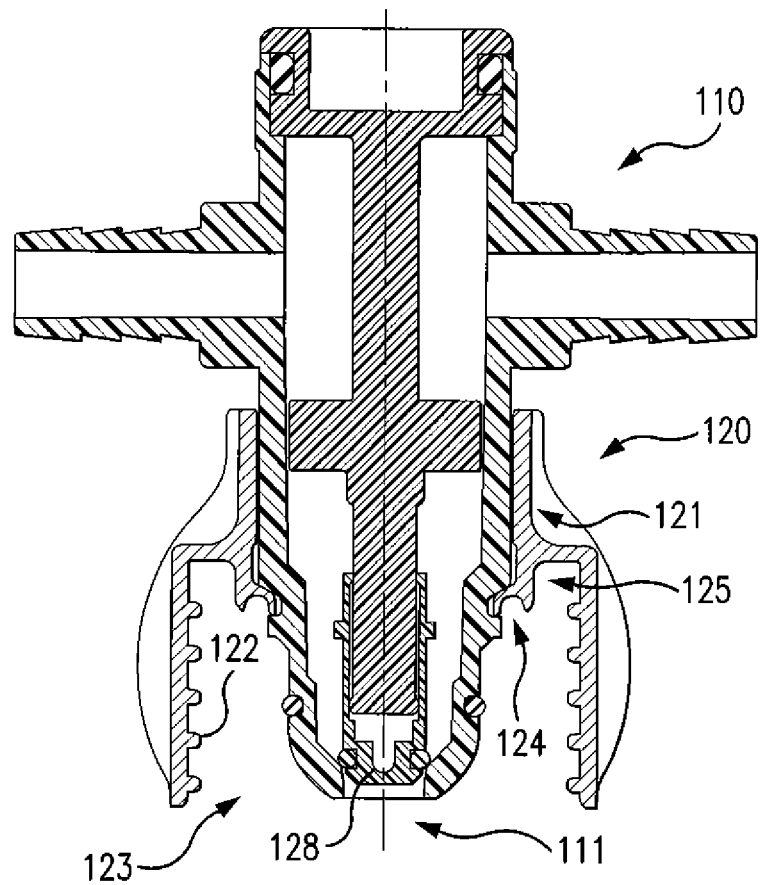
FIG. 5 is a cross-section of a valve fitment assembly of a dispensing connector and a collar as shown in FIG. 1 in relationship to the flush adaptor shown in FIG. 5A.
Figure 5A:
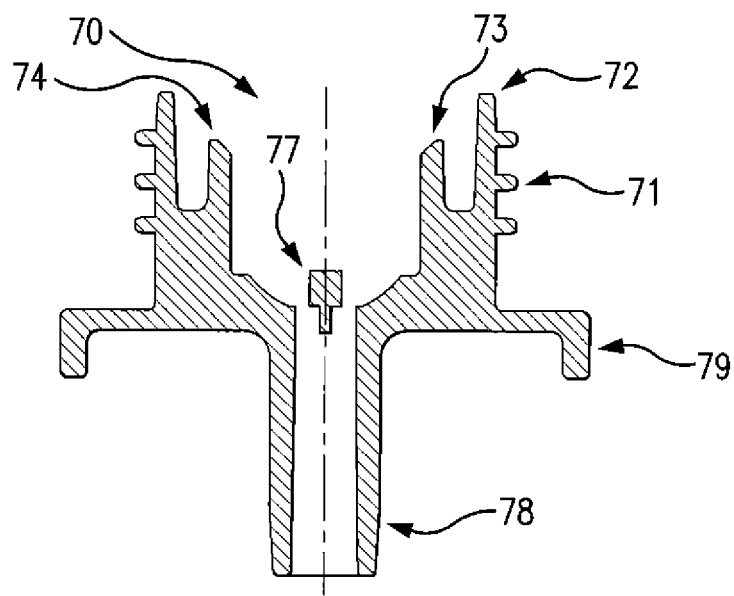
FIG. 5A is a cross-section of the flush adaptor use in conjunction with the valve fitment assembly of FIG. 5.
Figure 6:
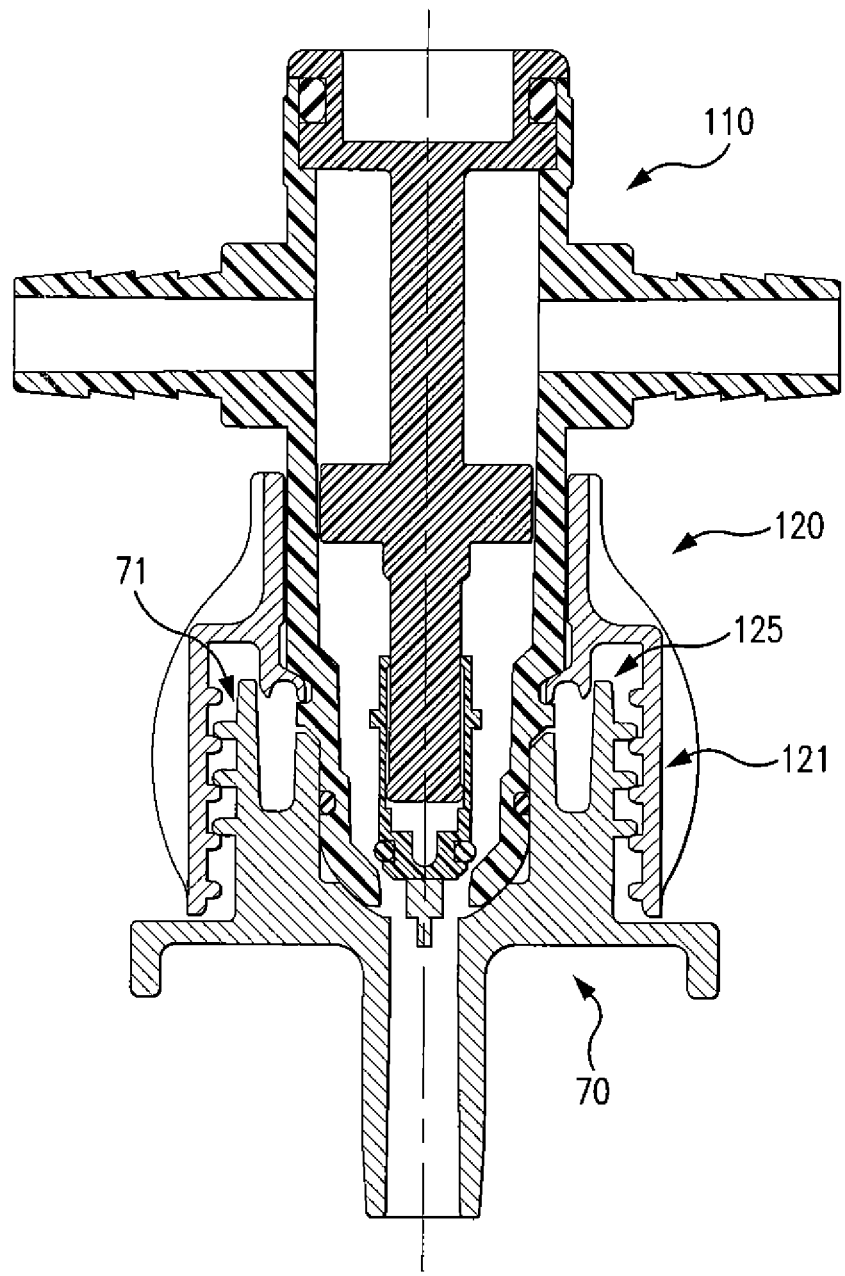
FIG. 6 is the same cross-section shown in FIG. 5 and FIG. 5A except the fitment assembly is engaged with the flush adaptor.

A fluid dispensing system is shown in FIGS. 1A, and 1B. To clean the fluid dispensing system, the dispensing connector 110, FIG. 1, is disconnected from the adaptor 50, FIG. 1A, for dispensing fluids and connected to flush adaptor 70, FIGS. 2-4. FIG. 5 shows the dispensing connector in relation to the flush adaptor 70 of FIG. 5A. FIG. 6 shows the flush adaptor 70 seated in the dispensing connector 110. To clean the system, a line (not shown) is attached to adaptor 70 via hollow stem 78 molded in the adaptor and a liquid usually water or water containing a detergent is passed through the system for cleaning.

In the operation of the fluid dispensing system, a fitment assembly is attached to a fluid container containing a fluid, such as soda water or juices, as shown in FIG. 1A, and 1B. FIG. 1 shows a cross-section of a dispensing connector 110; FIG. 1A shows a cross-section of an adaptor 50; and a FIG. 1B shows a cross-section of a cylindrical spout and valve assembly 30 attached to a fluid container.

FIG. 1 shows the dispensing connector 110 positioned in collar 120. The dispensing connector 110 comprises valve stem 126 having an inner collar 127 around the valve stem and a nipple 128 attached at the end of the valve stem 126. The connector has two exit ports 129 and 130 and fluid from the fluid container 40 (FIG. 1B) flows through these ports when the dispensing connector is in an open position. Collar body 121 is in an abutting relationship with the dispensing connector 110 and has an internal threaded flange 122, which engages with the threaded external outer ring 51 of the adaptor 50 (FIG. 1A). Receiving space 123 allows the adaptor 50 to be positioned in the receiving space 123.

The adaptor 50 (FIG. 1A) having a threaded external outer ring-collar 51 is screwed into and meshed with the internal threads of the threaded flange 122 of the collar body 121. The top 51a of the threaded external outer ring-collar 51 is sealed with the grooved area 125 of the collar body 121. Also, the U-shaped channel 54 formed by the outer ring-collar 51 and the interior ring-collar 51b of the adaptor 50 is sealed in grove 124 of the collar body 121. These seals prevent leakage of fluid from the container 40 as the fluid is being dispensed. Molded to the collar 51 of the adaptor 50 is a flange 57 that holds the collar body 121 in place. Locking tabs 58 and 58a are attached to flange 57 and lock the collar body 121 in place to prevent movement and leakage of fluid being dispensed. Groove 59 of the adaptor 50 has an O-ring (not shown) positioned therein to form a seal with the dispensing connector 110. Groove 60 positioned at the bottom of the adaptor 50 having an O-ring (not shown) forms a seal with cylindrical spout 31. Ridge 56 positioned at the bottom of the adaptor 50 retains valve opening device 61 that depresses valve assembly 35 positioned in cylindrical spout 31 to allow flow of liquid from container 40. Openings 62 in the inverted dome 55 of the adaptor 50 allow fluid to flow from the container 40.

The cylindrical spout and valve assembly 30 (FIG. 1B) are attached by conventional means, such as by heat-sealing or with an adhesive, to fluid container 40. The cylindrical spout 30 has an exterior threaded collar 32 that meshes with the internal threaded part of the collar 52 of the adaptor 50 and is positioned in the receiving space 53 of the adaptor 50. Spout flange 33 is in contact with flange 57 of the adaptor. A cylindrical support collar 34 is attached to flange 33 that supports flange 33 and rests on rest on the fluid container 40. Valve assembly 35 is positioned in the center of the cylindrical spout and valve assembly 30. When the valve head 36 is depressed on engagement with the valve opening device 61 positioned below the adaptor 50 and which is actuated by nipple 128 of the valve stem 126 when the valve stem 126 is engaged into its open position, the top of the fluid container 41 is depressed and opened and fluid flows from the fluid container 40 out through the dispenser connector 110 and out through the fluid exit ports 129 and 130.

The following is a description of the operation of the fitment, adaptor and spout and valve assembly for the release of fluid from a container. Valve stem 126 of the dispensing connector 110 is depressed, which can be accomplished by simply sliding the valve stem into an engaged position or the valve stem can be threaded in the dispensing connector 110 and rotated into the engaged position. The nipple 128 attached to the bottom of the valve stem 126 engages the valve opening device 61 thereby depressing the valve head 36, and the top 41 of the fluid container 40 is depressed and opened and fluid from the container 40 flows through openings in the bottom of the cylindrical spout 31 wherein ribs 37 encircle the valve head 36 but provide opening for the flow of fluid. The fluid then flows thorough the dispensing connector 110 out either or both exists 129 and 130 of the dispensing connector 110.

For cleaning the system, the dispensing connector 110 is disconnected from the adaptor 50 by unscrewing it from the adaptor 50. The flush adaptor 70 used for cleaning (FIGS. 2-4) is then threaded into the dispensing connector 110. The adaptor 70 (FIG. 2 bottom view and FIG. 3 top view) having a threaded external outer ring-collar 71 is screwed into and meshed with the internal threads of the threaded flange 122 of the collar body 121 (FIGS. 5, 5A and 6). The top 72 of the threaded external outer ring-collar 71 is sealed with the grooved area 125 of the collar body 121. Also, the U-shaped channel 74 formed by the outer ring-collar 71 and the interior ring-collar 73 of the flush adaptor 70 (FIG. 4) is sealed in grove 124 of the collar body 121 (FIGS. 5 and 5A). These seals prevent leakage of fluid as the fluid is forced through the dispenser connector 110 and into fluid dispensing lines (not shown) attached to the connector. Molded to the collar 71 of the adaptor 70 is a flange with and edge 79 that holds the collar body 121 in place. Ridge 75 of the adaptor 70 and seat area 76 of the adaptor 70 each form a seal with the dispensing connector 110 (FIGS. 4, 5, 5A and 6). Pin 77 molded to hollow stem 78 to which a hose (not shown) is connected that forces cleaning fluid into the system engages with nipple 128 of the valve stem 126 (FIGS. 5, 5A, and 6), thereby keeping it in the open position to allow for flow of cleaning fluid, usually water or water containing a detergent.

Figure 7:
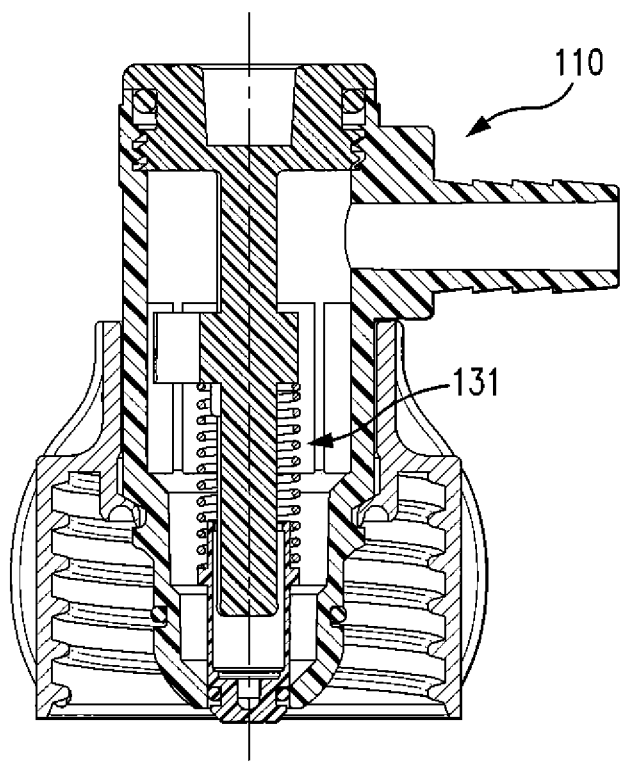
FIG. 7 is a cross-section of a valve fitment assembly having a single fluid exit.
Figure 7A:
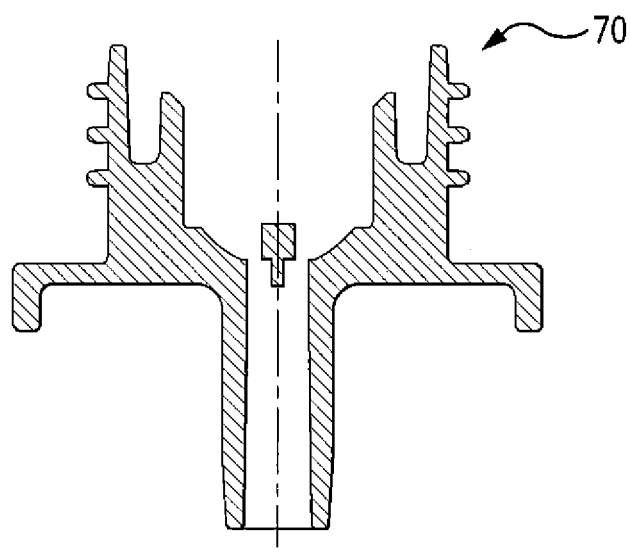
FIG. 7A is a cross-section of the flush adaptor shown in relation to the valve fitment assembly of FIG. 7.

FIG. 7 illustrates a dispensing connector 110 having one exit port with a spring 131 positioned adjacent to the valve stem and FIG. 7A illustrates the flush adaptor 70 in relationship with the dispensing connector.

In one embodiment, the adaptors 50 and 70 are each molded from an elastomer, such as a polyurethane or a thermoplastic, such as high density polyethylene or polypropylene.

These and other aspects of the invention do not limit the understanding and communication of the invention, as expressed in the appended claims.

Labeling In Figures

FIG. 1
110 Dispensing Connector
111 Open end of Dispensing Connector
120 Collar
121 Collar body
122 Internal threaded flange of collar body
123 Receiving space in collar body
124 Groove for placement of adaptor
125 Grooved area for receiving 51*a* (threaded collar of adaptor 50)
126 Valve stem
127 Inner collar surrounding valve stem
128 Nipple attached to end of valve stem
129/130 Fluid exits ports from dispensing connector FIG. 1A
50 Adaptor
51 Threaded external outer ring-collar of adaptor
51*a* Top of threaded outer ring-collar of adaptor
51*b* Interior ring-collar of adaptor
52 Internal threaded part of the collar of the adaptor
53 Receiving space for threaded collar of cylindrical spout 30
54 U shaped channel for receiving and sealing collar 120
55 Inverted dome of adaptor having openings not shown
56 Ridge for holding valve opening device
57 Flange
58 Locking tab for holding collar 120 in place
58*a* Locking tab for holding collar 120 in place
59 Groove having an O ring (not shown) positioned therein for sealing dispersion connector
60 Groove having an O ring (not shown) positioned therein to seal cylindrical spout 31
61 Valve opening device for depressing valve head 36
62 Opening in dome of adaptor for fluid flow FIG. 1B
30 Cylindrical spout and valve assembly
31 Cylindrical spout
32 Threaded collar of cylindrical spout
33 Spout flange
34 Cylindrical support collar
35 Valve assembly for flow of liquid from fluid container 40
36 Valve head
37 Ribs surrounding valve head providing opening for fluid flow
40 Fluid container
41 Top of fluid container in contact with valve head 36

FIGS. 2, 3, 4, 5A, and 6
70 Flush Adaptor
71 Threaded external outer ring-collar of adaptor
72 Top of threaded outer ring-collar of adaptor
73 Interior ring-collar of adaptor
74 U-shaped channel for receiving and sealing collar 120
75 Ridge for sealing dispensing connector 110
76 Seat area for sealing dispensing connector 110
77 Pin for holding open nipple 128 of valve stem 126 of dispensing connector 110
78 Hollow stem molded into the flush adaptor 70 for connecting hose for cleaning
79 Flange with an edge molded to the bottom of the outer collar 71 of flush adaptor 70.

FIG. 7
110 Dispensing Connector
131 Spring for valve stem
70 Flush Adaptor

The invention claimed is:

1. A flush adaptor for use with a valve fitment assembly for dispensing liquids from a container; wherein said flush adaptor comprises the following:
   (I) an outer ring-collar having a top and a bottom and an outer and inner surface and having threads molded into said outer surface of said outer ring-collar;
   (II) a flange with an edge molded to the bottom of said outer ring-collar of said flush adaptor;
   (III) an interior ring-collar having a top and a bottom and an outer and an inner surface molded in adjacent relationship to said outer ring-collar near the top of said interior ring-collar, and
      wherein said outer surface of the top part of said interior ring-collar and the top part of said inner surface of said outer ring-collar forms a U-shaped channel for receiving a part of said valve fitment assembly;
   (IV) an inverted dome structure molded toward the bottom of said inner surface of said interior ring-collar defining at least one opening for the flow of fluid therethrough;
   (V) a ridge molded in said inner surface of said interior ring-collar centrally positioned in said interior ring-collar;
   (VI) a seat molded onto the bottom of said interior ring-collar for forming a seal with said valve fitment assembly;
   (VII) a pin molded into the bottom of said interior ring-collar, which engages said valve fitment assembly and keeps a valve in said valve fitment assembly in an open position thereby allowing flow of fluid through said valve fitment assembly; and
   (VIII) a hollow tube molded into the bottom of said adaptor and to said pin to allow the flow of liquid through said adaptor and into said valve fitment assembly;
whereby the flush adaptor connected to said valve fitment assembly allows for cleaning of said valve fitment assembly and any tubes connected thereto by passing a liquid through said hollow tube of said flush adaptor and into said valve fitment assembly and lines connected thereto, thereby cleaning said valve fitment assembly and lines.

2. The adaptor as recited in claim 1, wherein said adaptor is a molded plastic or elastomer.

3. The adaptor as recited in claim 1, wherein said adaptor is molded polyurethane.

4. A process for cleaning a valve fitment assembly attached to a container having fluid therein, and fluid-transporting lines connected thereto, which comprises the steps of:
   (1) removing said valve fitment assembly from said fluid container;
   (2) attaching said flush adaptor of claim 1 to said valve fitment assembly;
   (3) attaching a line for transporting a cleaning fluid to said hollow tube of said flush adaptor; and
   (4) flushing said cleaning fluid through said flushing adaptor, said valve fitment assembly, and any lines attached thereto, thereby cleaning said valve fitment assembly and lines.

\* \* \* \* \*